(12) United States Patent
Wadhwa et al.

(10) Patent No.: US 10,404,648 B2
(45) Date of Patent: Sep. 3, 2019

(54) ADDRESSING FOR CUSTOMER PREMISES LAN EXPANSION

(71) Applicants: Sanjay Wadhwa, Cupertino, CA (US); Jun Hu, San Jose, CA (US)

(72) Inventors: Sanjay Wadhwa, Cupertino, CA (US); Jun Hu, San Jose, CA (US)

(73) Assignee: Nokia of America Corporation, Murray Hill, NJ (US)

( * ) Notice: Subject to any disclaimer, the term of this patent is extended or adjusted under 35 U.S.C. 154(b) by 247 days.

(21) Appl. No.: 15/054,863

(22) Filed: Feb. 26, 2016

(65) Prior Publication Data
US 2017/0250945 A1 Aug. 31, 2017

(51) Int. Cl.
| | | |
|---|---|---|
| *H04L 29/12* | (2006.01) | |
| *H04L 12/46* | (2006.01) | |
| *H04L 12/721* | (2013.01) | |
| *H04L 12/24* | (2006.01) | |

(52) U.S. Cl.
CPC .......... *H04L 61/103* (2013.01); *H04L 12/462* (2013.01); *H04L 12/4633* (2013.01); *H04L 45/66* (2013.01); *H04L 41/5054* (2013.01); *H04L 41/5077* (2013.01); *H04L 61/6022* (2013.01); *H04L 61/6068* (2013.01)

(58) Field of Classification Search
CPC .................................................... H04L 61/103
See application file for complete search history.

(56) References Cited

U.S. PATENT DOCUMENTS

| | | |
|---|---|---|
| 7,916,740 B2 | 3/2011 | Zheng |
| 8,295,289 B2 | 10/2012 | Harmatos et al. |
| 8,751,614 B2 | 6/2014 | Haddad et al. |
| (Continued) | | |

FOREIGN PATENT DOCUMENTS

EP        2522176        11/2013

OTHER PUBLICATIONS

International Search Report and Written Opinion from corresponding PCT Application No. PCT/US2017/018583, dated May 2, 2017, 14 pages.

(Continued)

*Primary Examiner* — Sulaiman Nooristany
(74) *Attorney, Agent, or Firm* — Tong, Rea, Bentley & Kim, LLC

(57) ABSTRACT

The present disclosure generally discloses an addressing mechanism adapted for extending a customer local area network of a customer premises of a customer outside of the customer premises and into a private data network with improved scalability and performance. The extension of a local area network of a customer premises of a customer outside of the customer premises and into a private data network may be provided using a customer bridge associated with the customer local area network of the customer, a customer bridging domain hosted on a network gateway device for the customer, and a switching element hosted in the private data network for the customer for one or more customer components hosted within the private data network for the customer. The addressing mechanism may include one or more of address announcement functions, address resolution functions, address translation functions, or the like, as well as various combinations thereof.

20 Claims, 5 Drawing Sheets

(56) References Cited

U.S. PATENT DOCUMENTS

2004/0095940 A1    5/2004    Chin et al.
2011/0090911 A1*   4/2011    Hao .................... H04L 12/4633
                                                                       370/395.53
2014/0223538 A1    7/2014    Van De Velde et al.

OTHER PUBLICATIONS

Sajassi et al., "BGP MPLS-Based Ethernet VPN," Internet Engineering Task Force, IETF, RFC7432, Feb. 18, 2015, pp. 1-56.

ETSI, "Network Functions Virtualisation (NFV); Ecosystem; Report on SDN Usage in NFV Architectural Framework," Group Specifications Standards Institute (ETSI) GS NFV-EVE 005, V1.1.1, Dec. 31, 2015, 125 pages.

Singla et al., "Architecture Documentation, OpenContrail Architecture Document," Jan. 24, 2015, pp. 1-35, retrieved from the Internet on Jun. 22, 2016 from the following link: https://web.archive.org/web/20150124113037//http://opencontrail.org/opencontrail-architecture-documentation.

Rabadan et al., "Operational Aspects of Proxy-ARP/ND in EVPN Networks," draft-snr-bess-evpn-proxy-arp-nd-02, IETF, BESS workgroup, Oct. 6, 2015.

\* cited by examiner

ADDRESSING FOR CUSTOMER PREMISES LAN EXPANSION

TECHNICAL FIELD

The disclosure relates generally to the field of communications and, more particularly but not exclusively, to supporting the communications of a customer premises network.

BACKGROUND

A customer of a service provider may utilize various types of customer devices, typically referred to as customer premises equipment (CPE), at the customer premises of the customer. For example, the CPEs at a customer premises may include devices such as telephones, smartphones, set-top boxes, smart televisions, routers, switches, residential gateways (RGs), or the like. The CPEs at the customer premises may be networked together using a customer local area network (LAN) at the customer premises. The CPEs at the customer premises may communicate with each other or with other device located outside of the customer premises. The CPEs at the customer premises may connect to and disconnect from the customer LAN relatively frequently (at least for some types of CPEs), such as where CPEs arrive at and leave from the customer premises, which may create various scalability and performance issues for a service provider supporting the various customer premises.

SUMMARY

The present disclosure generally discloses an addressing mechanism related to use of addresses for communications by customer devices.

In at least some embodiments, an apparatus includes a processor and a memory communicatively connected to the processor. The processor is configured to announce, by a controller of a network device hosting a customer bridging domain associated with a customer network element of a customer toward a controller of a private data network hosting a customer component for the customer, an address of the customer bridging domain. The processor is configured to receive, by the controller from the customer bridging domain, an address resolution request of the customer component for a customer device associated with the customer network element of the customer, wherein the address resolution request includes an address of the customer device. The processor is configured to propagate, from the controller toward the customer bridging domain, an address resolution response for the customer component, wherein the address resolution response includes the address of the customer device and the address of the customer bridging domain.

In at least some embodiments, a method is provided. The method includes announcing, by a controller of a network device hosting a customer bridging domain associated with a customer network element of a customer toward a controller of a private data network hosting a customer component for the customer, an address of the customer bridging domain. The method includes receiving, by the controller from the customer bridging domain, an address resolution request of the customer component for a customer device associated with the customer network element of the customer, wherein the address resolution request includes an address of the customer device. The method includes propagating, from the controller toward the customer bridging domain, an address resolution response for the customer component, wherein the address resolution response includes the address of the customer device and the address of the customer bridging domain.

In at least some embodiments, an apparatus includes a processor and a memory communicatively connected to the processor. The processor is configured to receive, by a customer bridging domain hosted by a network element for a customer, a packet intended for a customer device associated with a customer network element of the customer, wherein the packet includes a Layer 2 (L2) address of the customer bridging domain. The processor is configured to modify the packet at the customer bridging domain, by removing from the packet the L2 address of the customer bridging domain and inserting within the packet an L2 address of the customer device, to form a modified packet. The processor is configured to propagate the modified packet from the customer bridging domain toward the customer network element.

In at least some embodiments, a method is provided. The method includes receiving, by a customer bridging domain hosted by a network element for a customer, a packet intended for a customer device associated with a customer network element of the customer, wherein the packet includes a Layer 2 (L2) address of the customer bridging domain. The method includes modifying the packet at the customer bridging domain, by removing from the packet the L2 address of the customer bridging domain and inserting within the packet an L2 address of the customer device, to form a modified packet. The method includes propagating the modified packet from the customer bridging domain toward the customer network element.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure generally discloses an addressing mechanism configured to provide improved scalability and performance within the context of communication networks. The addressing mechanism may be configured to support extension of a customer local area network of a customer premises of a customer outside of the customer premises and into a private data network with improved scalability and performance. The extension of a local area network of a customer premises of a customer outside of the customer premises and into a private data network may be provided using a customer bridge associated with the customer local area network of the customer, a customer bridging domain hosted on a network gateway device for the customer, and a switching element hosted in the private data network for the customer for one or more customer components hosted within the private data network for the customer. The addressing mechanism may include one or more of address announcement functions, address resolution functions, address translation functions, or the like, as well as various combinations thereof. The network gateway device may be configured to support address announcement functions, address resolution functions, address translation functions, or the like, as well as various combinations thereof. The addressing mechanism may be provided based on assignment, or association, of a Layer 2 (L2) address (e.g., Media Access Control (MAC) address or other suitable L2 address) to the customer bridging domain hosted on the network gateway device for the customer. In various embodiments, the L2 address of the customer bridging domain may be announced by the network gateway device to the private data network, used by the network gateway device to provide address resolution functions responsive to address resolution requests from customer components of the private data network, used by the network gateway device to support packet forwarding for the customer, or the like, as well as various combinations thereof. These and various other embodiments of the addressing mechanism configured to provide improved scalability and performance within the context of communication networks may be further understood by way of reference to FIG. 1.

Figure 1:
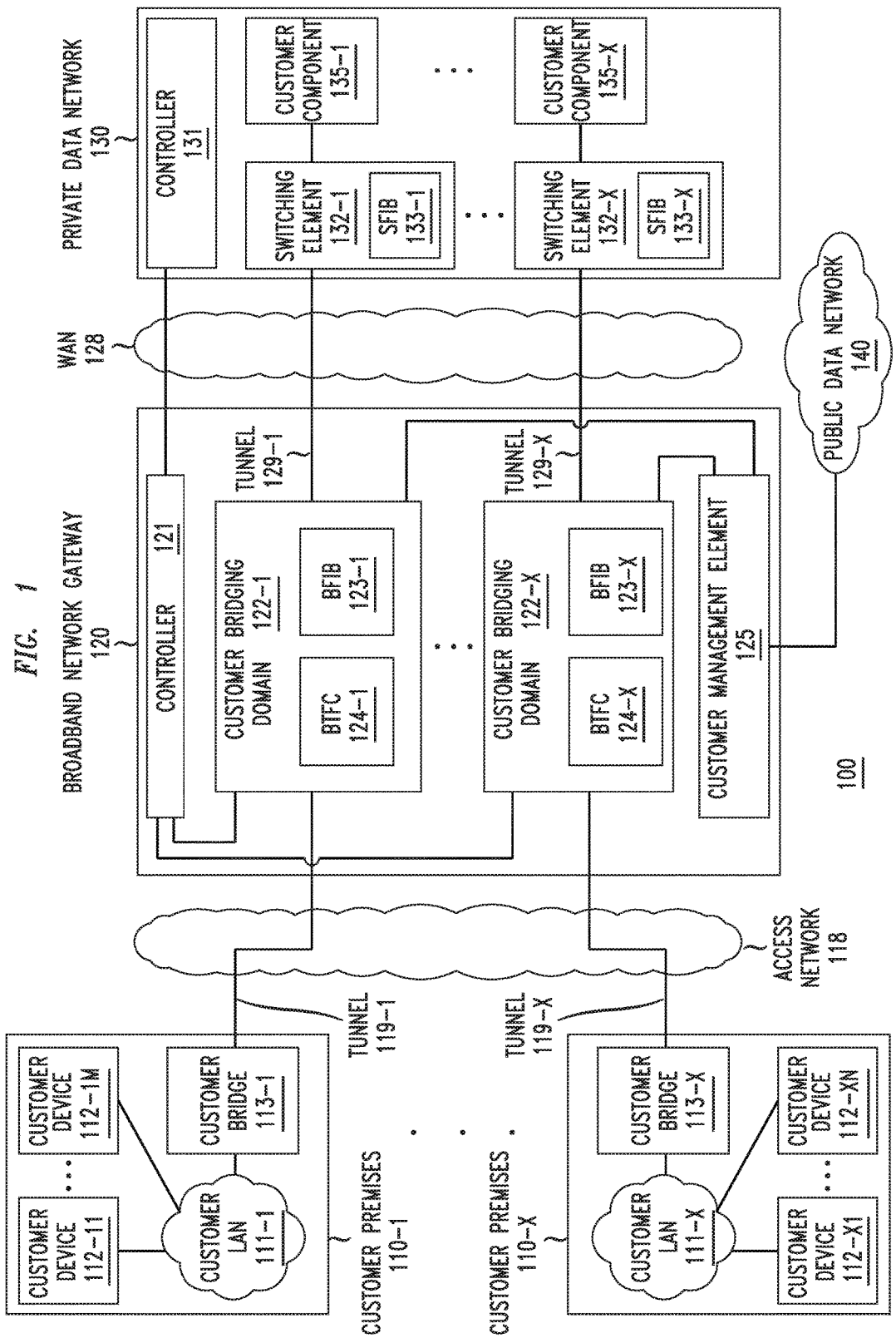
FIG. 1 depicts a system supporting an addressing mechanism for extension of local area networks of customer premises to a private data network.

FIG. 1 depicts a system supporting extension of local area networks of customer premises to a private data network.

The system 100 includes devices deployed at a plurality of customer premises 110-1-110-X (collectively, customer premises 110), a broadband network gateway (BNG) 120, a private data network 130, and a public data network 140.

The customer premises 110 may be any suitable customer locations at which customer equipment of customers may be deployed. For example, customer premises 110 may include homes, small businesses, enterprise business locations, or the like. It will be appreciated that the customers may be customers of one or more operators or providers. For example, network access from the customer premises 110 may be provided by network access providers or operators while the private data network may be provided by a private data network provider or operator (e.g., a datacenter operator where private data network 130 is a datacenter).

The customer premises 110-1-110-X include a plurality of customer local area networks (LANs) 111-1-111-X (collectively, customer LANs 111), respectively, supporting respective sets of customer devices 112-1-112-X (collectively, customer devices 112) located within customer premises 110-1-110-X, respectively. The customer LANs 111-1-111-X support the respective sets of customer devices 112-1-112-X (illustratively, customer LAN 111-1 of customer premises 110-1 supports a set of customer devices 112-11-112-1M and so forth, with customer LAN 111-X of customer premises 110-X supporting a set of customer devices 112-X1-112-XN). The customer LAN 111 of a customer premises 110 may be provided using any suitable LAN technologies. For example, the customer LAN 111 of a customer premises 110 may utilize Ethernet, WiFi, or any other protocol(s) suitable for supporting the customer LAN 111. The customer devices 112, at least some of which also may be referred to as customer premises equipment (CPE), may include any devices which may communicate via the customer LANs 111. For example, the customer devices 112 may include desktop computers, laptop computers, tablet computers, printers, media devices, smartphones, set-top boxes, smart devices (e.g., televisions, appliances, or the like), servers, switches, routers, or the like, as well as various combinations thereof.

The customer premises 110-1-110-X include a plurality of customer bridges 113-1-113-X (collectively, customer bridges 113), respectively. The customer bridge 113 of a customer premises 110 may be configured to function as a point of access of the customer premises 110, operating as a gateway between the customer LAN 111 of the customer premises 110 and locations and devices located outside of the customer premises 110. The customer bridges 113 may be configured to provide network bridging functions for the customer premises 110, respectively. The customer bridges 113 may be configured to provide network bridging functions for the customer premises 110, respectively, at Layer 2 of the Open Standards Interconnection (OSI) model. The customer bridges 113 may be used in place of customer routers typically used as the point of access of customer premises (which operate at Layer 3 of the OSI model). It is noted that the customer bridges 113 also may be referred to herein as bridge customer premises equipment (BCPE). It is noted that the customer bridges 113 also may be referred to more generally herein as customer network elements.

The customer bridges 113-1-113-X support a plurality of tunnels 119-1-119-X (collectively, tunnels 119) to respective customer bridging domains (discussed further below) that are hosted within the BNG 120 for the customer premises 110-1-110-X, respectively. The tunnels 119 may include virtual local area network (VLAN) tunnels, L2 Tunneling Protocol (L2TP) tunnels (e.g. L2TPv3 tunnels or other suitable L2TP tunnels), Internet Protocol (IP) tunnels (e.g., Generic Routing Encapsulation (GRE) tunnels or other suitable types of IP-based tunnels), or the like. The tunnels 119 may support transport of Ethernet traffic (e.g., native Ethernet traffic via VLAN tunnels, IP tunnels in which the payload includes Ethernet frames, or the like) or other suitable types of Layer 2 traffic which may be supported by the customer LANs 111. The communication between the customer premises 110-1-110-X and the BNG 120 may be supported by an access network (AN) 118, in which case the tunnels 119-1-119-X may be established over the AN 118. The AN 118 may be any suitable type of AN, which may utilize various communications technologies. For example, the AN 118 may utilize various types of underlying access technologies, such as fixed broadband access typically available to customer premises (e.g., cable access networks, Digital Subscriber Line (DSL) access networks, optical access networks, or the like), wireless broadband access, or the like, as well as various combinations thereof.

The customer bridges 113-1-113-X support various customer traffic bridging functions for customer LANs 111-1-111-X, respectively. For upstream traffic originating from customer devices 112 of a customer premises 110, the customer bridge 113 associated with the customer premises 110 may be configured to determine whether to bridge the traffic within the customer premises 110 (e.g., to direct a packet received via a first customer device 112 of the customer premises 110 to a second customer device 112 of the customer premises 110 via the associated customer LAN 111) or to provide the traffic to the tunnel 119 associated with the customer bridge 113 for propagation outside of the customer premises 110 toward BNG 120. For downstream traffic received by a customer bridge 113 of a customer premises 110, the customer bridge 113 may be configured to forward the traffic toward the customer device(s) 112 of the customer premises 110 for which the traffic is intended (e.g., via the associated customer LAN 111). As discussed further below, forwarding of traffic by the customer bridges 113 of the customer LANs 111 may be based on the destination addresses (e.g., destination MAC addresses or other suitable types of addresses).

The BNG 120 is configured to provide various broadband network gateway functions for the customer premises 110. The BNG 120 includes a controller 121, a plurality of customer bridging domains 122-1-122-X (collectively, customer bridging domains 122), and a customer management element 125.

The controller 121 is configured to provide various control functions for BNG 120. The controller 121 may be configured to interface with a controller of the private data network 130 (e.g., to support exchanging of information which is used to support communications by the customer devices 112 of the customer LANs 111 and by the customer components of the private data network 130 that are associated with the customer LANs 111, as discussed further below).

The customer bridging domains 122-1-122-X provide bridging domains for the customer premises 110-1-110-X, respectively. The customer bridging domains 122-1-122-X may be configured to operate as virtual bridging elements for customer premises 110-1-110-X, respectively. For example, the customer bridging domains 122 may be implemented as Layer 2 virtual devices (e.g., virtual Ethernet bridges). For example, the customer bridging domains 122 may be implemented as Layer 2 virtual private network services (VPNSs). For example, the customer bridging domains 122 may be implemented using other suitable Layer 2 virtual devices or services. The customer bridging domains 122-1-122-X also may be referred to herein as virtual customer gateways for the customer premises 110-1-110-X, respectively (or, more specifically, as virtual residential gateways (vRGWs) where the customer premises 110 are residences, as virtual enterprise gateways (vEGWs) where the customer premises are enterprise locations, or the like).

The customer bridging domains 122-1-122-X support a plurality of tunnels 129-1-129-X (collectively, tunnels 129) to respective switching elements (discussed further below) that are hosted within the private data network 130 for the customer premises 110-1-110-X, respectively. The tunnels 129-1-129-X enable the customer bridging domains 122-1-122-X (and, thus, the associated customer LANs 111-1-111-X) to be extended into the private data network 130. The tunnels 129 may include virtual extensible local area network (VXLAN) tunnels, Multi-Protocol Label Switching (MPLS) tunnels, or the like. The tunnels 129 may support transport of Ethernet traffic or other suitable types of Layer 2 traffic which may be supported by the customer LANs 111. The communication between BNG 120 and private data network 130 may be supported by a wide area network (WAN) 128, in which case the tunnels 129-1-129-X may be established over the WAN 128. The WAN 128 may be any suitable type of WAN, which may utilize various communications technologies. For example, the WAN 128 may be a wired core network, a wireless core network, or the like, as well as various combinations thereof.

The customer bridging domains 122-1-122-X are each communicatively connected to the customer management element 125, which provides an interface to the public data network 140 to support forwarding of traffic between the customer premises 110-1-110-X and the public data network 140 as discussed further below.

The customer bridging domains 122-1-122-X include a plurality of bridge forwarding information bases (BFIBs) 123-1-123-X (collectively, BFIBs 123), respectively. The BFIBs 123-1-123-X are configured to store information which may be used by the respective customer bridging domains 122-1-122-X to support forwarding of customer traffic associated with the respective customer premises 110-1-110-X. For example, the information maintained within a BFIB 123 associated with a customer bridging domain 122 may include address information (e.g., MAC addresses of customer devices 112 of the customer premises 110, IP addresses of customer devices 112 of the customer premises 110, MAC addresses of customer components hosted for the customer within the private data network 130, IP addresses of customer components hosted for the customer within the private data network 130, or the like), tunnel information (e.g., tunnel endpoint information for the tunnel 119 between the customer bridge 113 of the customer premises 110 and the customer bridging domain 122, tunnel endpoint information for the tunnel 129 between the customer bridging domain 122 and switching elements of the private data network 130, or the like), packet forwarding information (e.g., mappings between addresses and indications of forwarding of packets directed to the respective addresses), or the like, as well as various combinations thereof. The customer bridging domains 122-1-122-X each are configured to communicate with controller 121 to support exchanging of information which may be used to support forwarding of customer traffic associated with respective customer premises 110-1-110-X, which is discussed further below.

The customer bridging domains 122-1-122-X include a plurality of bridge traffic forwarding controllers (BTFCs) 124-1-124-X (collectively, BTFCs 124), respectively. The customer bridging domains 122-1-122-X each are configured to communicate with the private data network 130 and the public data network 140 under the control of the respective BTFCs 124-1-124-X of customer bridging domains 122-1-122-X based on information available from the BFIBs 123-1-123-X, respectively. The customer bridging domains 122-1-122-X each are configured to communicate with the private data network 130 and the public data network 140 under the control of the respective BTFCs 124-1-124-X of the customer bridging domains 122-1-122-X, respectively, to support communication of customer traffic between the customer bridging domains 122-1-122-X and the private data network 130 and to support communication of customer traffic between the customer bridging domains 122-1-122-X and the public data network 140. The operation of BFTCs 124-1-124-X of respective customer bridging domains 122-1-122-X in controlling the forwarding of customer traffic based on BFIBs 123-1-123-X is discussed further below.

The customer management element 125 is configured to provide functions typically provided by a broadband network gateway for traffic intended for transport via the Internet or other suitable type of public data network. For example, the customer management element 125 may be configured to provide one or more of authentication functions, authorization functions, accounting functions, quality-of-service (QoS) monitoring functions, QoS application functions, or the like, as well as various combinations thereof. It is noted that the customer management element 125 may be configured to provide various other functions as discussed further below.

The private data network 130 may include any private data network which may host elements which may be configured to operate as extensions of the customer LANs 111 of the customer premises 110. For example, the private data network 130 may be an operator network (e.g., a private network of a network operator, a datacenter of a cloud operator, a network of a cloud operator (e.g., multiple datacenters), or the like), a private enterprise network, or the like. The private data network 130 includes a controller 131, a plurality of switching elements 132-1-132-X (collectively, switching elements 132), and a plurality of customer components 135-1-135-X (collectively, customer components 135). It will be appreciated that, although primarily depicted and described with respect to embodiments in which the switching elements 132 and the customer components 135 are disposed within a single private data network (illustratively, private data network 130), the switching elements 132 and associated customer components 135 may be distributed across multiple private data networks.

The controller 131 is configured to provide various control functions for private data network 130. The controller 131 may be configured to interface with controller 121 of the BNG 120 (e.g., to support exchanging of information which is used to support communications by the customer devices 112 of the customer LANs 111 and by the customer components of the private data network 130 that are associated with the customer LANs 111, as discussed further below).

The switching elements 132-1-132-X are configured to forward, or bridge, traffic of customer components 135-1-135-X, respectively. Namely, the switching elements 132-1-132-X are configured to (1) forward traffic received via the respective tunnels 129-1-129-X toward the respective customer components 135-1-135-X and (2) forward traffic received from the customer components 135-1-135-X toward the respective customer bridging domains 122-1-122-X via respective tunnels 129-1-129-X. The switching elements 132 may be physical switches, virtual switches hosted on physical hardware, or the like. It will be appreciated that the implementation of switching elements 132 may depend on the type of private data network 130 in which the switching elements 132 are deployed (e.g., physical switches or virtual switches in an operator network, physical or virtual switches in a datacenter, or the like).

The switching elements 132-1-132-X include a plurality of switch forwarding information bases (SFIBs) 133-1-133-X (collectively, SFIBs 133), respectively. The SFIBs 133-1-133-X are configured to store information which may be used by the respective switching elements 132-1-132-X to support forwarding of customer traffic toward the respective customer components 135-1-135-X. For example, the information maintained within an SFIB 133 of a switching element 132 to support forwarding of customer traffic toward the respective customer component 135 may include address information (e.g., the MAC address of the customer component 135), port information (e.g., the virtual port associated with the customer component 135), packet forwarding information (e.g., a mapping of the MAC address of the customer component 135 to the virtual port associated with the customer component 135), or the like, as well as various combinations thereof. The SFIBs 133-1-133-X are configured to store information which may be used by the respective switching elements 132-1-132-X to support forwarding of customer traffic from the respective customer components 135-1-135-X. For example, the information maintained within an SFIB 133 associated with a switching element 132 may include address information (e.g., a MAC address of the customer bridging domain 122, as discussed further below), tunnel information (e.g., tunnel endpoint information for the tunnel 129 between the customer bridging domain 122 and the associated switching element 132), packet forwarding information (e.g., a mapping between the MAC address of the associated customer bridging domain 122 and the tunnel 129 between the customer bridging domain 122 and the associated switching element 132, as discussed further below), or the like, as well as various combinations thereof. The switching elements 132-1-132-X each are configured to communicate with controller 131 to support exchanging of information which may be used to support forwarding of customer traffic associated with respective customer premises 110-1-110-X, which is discussed further below.

The customer components 135-1-135-X may be configured to operate as extensions of the customer LANs 111-1-111-X of the customer premises 110-1-110X, respectively. The customer components 135 may be physical components, virtual components, or the like. For example, the customer components 135 may include physical or virtual servers (e.g., media servers, Digital Living Network Alliance (DLNA) servers, or the like), virtual machines (VMs), physical or virtual file systems, physical or virtual databases, or the like. It will be appreciated that, although primarily presented herein with respect to embodiments in which each of the customer LANs 111-1-111-X has only a single customer component 135 associated therewith (illustratively, customer components 135-1-135-X associated with respective customer LANs 111-1-111-X), each of the customer LANs 111-1-111-X may have one or more customer components 135 associated therewith.

As discussed herein, customer bridges 113-1-113-X, tunnels 119-1-119-X, customer bridging domains 122-1-122-X, and tunnels 129-1-129-X associated with the customer premises 110-1-110-X, respectively, enable customer components 135-1-135-X of private data network 130 to appear as devices of the customer LANs 111-1-111-X, respectively. In other words, for a given customer premises 110 of a customer, the customer bridge 113 of the customer premises 110, the tunnel 119 from the customer bridge 113 to the customer bridging domain 122 on the BNG 120 for the customer, the customer bridging domain 122 on the BNG 120 for the customer, the tunnel 129 from the customer bridging domain 122 on the BNG 120 for the customer to the switching element 132 in the private data network 130, and the switching element 132 in the private data network 130 provided an extended customer LAN for the customer that extends from the customer LAN 111 within the customer premises 110 to the customer component 135 that is hosted within the private data network 130 for the customer. In this manner, the customer LAN 111 for the customer, which would otherwise be restricted to the customer premises 110 of the customer, is extended into the private data network 130 such that the customer component 135 of the private data network 130 for the customer appears as a device of the customer LAN 111 of the customer.

The public data network 140 may be the Internet or any other suitable type of public data network. As indicated above, the public data network 140 is accessible from BNG 120 via the customer management element 125 of the BNG 120.

As discussed above, the BNG 120 and the private data network 130 are configured to support an addressing mechanism adapted for extending the LANs 111 of the customer premises 110 outside of the customer premises 110 and into the private data network 130 in a manner supporting improved scalability and performance. The improved scalability and performance associated with extension of the LANs 111 of the customer premises 110 into private data network 130 may be provided by obviating the need for the BNG 120 to advertise the individual MAC addresses of each of the individual customer devices 112 in each of the customer premises 110 to the private data network 130; rather, each of the customer bridging domains 122 of the respective customer premises 110 is assigned a respective MAC address (unique to the respective customer bridging domains 122 of the respective customer premises 110) that is used to represent the customer devices 112 at the respective customer premises 110. For example, for a customer premises 120 including X different customer devices 112 having X different MAC addresses, rather than advertising each of the X MAC addresses of the X customer devices 112 to the private data network 130, only the single, unique, MAC address of the customer bridging domain 122 of the customer premises 110 is announced to private data network 130. It will be appreciated that this savings in the number of MAC addresses to be advertised to the private data network 130, when multiplied across each of the customer premises 110, provides a significant improvement in scalability and performance. As discussed further below, the addressing mechanism may include one or more address announcement functions for announcing the MAC addresses of the respective customer premises 110 to the private data network 130, one or more address resolution functions for using address resolution based on the MAC addresses for the respective customer premises 110 in order to enable customer components 135 of the customers in the private data network 130 to communicate with customer devices 112 of respective customer premises 110 using the respective MAC addresses for the respective customer premises 110, one or more address translation functions for using address translation based on the MAC addresses for the respective customer premises 110 in order to enable customer components 135 of the customers in the private data network 130 to communicate with customer devices 112 of respective customer premises 110 using the respective MAC addresses for the respective customer premises 110 (rather than using the MAC addresses of the customer devices 112 of the respective customer premises 110), or the like, as well as various combinations thereof.

The BNG 120 and the private data network 130 may be configured to support an address announcement mechanism for announcing the MAC addresses of the customer premises 110 to the private data network 130. The controller 121 of the BNG 120, for a given customer premises 110, obtains a MAC address of the customer bridging domain 122 and announces the MAC address of the customer bridging domain 122 to the private data network 130. The MAC address of the customer bridging domain 122 may be assigned to, or associated with, the customer bridging domain 122. The MAC address of the customer bridging domain 122 may be a real MAC address or a fake MAC address. The MAC address of the customer bridging domain 122, although primarily described herein as being an address of the customer bridging domain 122, also may be considered to be associated with other elements that are associated with the customer bridging domain 122 (e.g., the customer bridge 113, the customer premises 110, or the like).

The controller 121 of the BNG 120, for a given customer premises 110, may obtain the MAC address of the customer bridging domain 122 in various ways. For example, the controller 121 may obtain the MAC address of the customer bridging domain 122 by deriving the MAC address for the customer bridging domain 122, obtaining the MAC address of the customer bridging domain 122 from a server configured to manage the MAC addresses for the customer premises 110 (e.g., by retrieval from the server where the MAC address has already been assigned, by requesting that the server derive the MAC address and provide it to the controller 121, or the like), obtaining the MAC address of the customer bridging domain 122 from the customer bridging domain 122 of the customer premises 110 (e.g., by retrieval from the customer bridging domain where the MAC address has already been assigned to the customer bridging domain 122, by requesting that the customer bridging domain derive the MAC address and provide it to the controller 121, or the like), or the like, as well as various combinations thereof. The MAC address for the customer bridging domain 122 may be a real MAC address or a fake MAC address. The MAC address of the customer bridging domain 122 may be a locally administered MAC address. The MAC address of the customer bridging domain may be set in various ways. For example, the MAC address of the customer bridging domain 122 may be set by setting the second bit of the first byte of the MAC address to "1". For example, the following MAC addresses may be assigned to customer bridging domains 122-1 through 122-X: 06-00-00-00-00-01 assigned to customer bridging domain 122-1, 06-00-00-00-00-02 assigned to customer bridging domain 122-2, 06-00-00-00-00-03 assigned to customer bridging domain 122-3, and so forth. It will be appreciated that the MAC addresses of the customer bridging domains 122 may be set in various other ways.

The controller 121 of the BNG 120 announces the MAC address of the customer bridging domain 122 to the private data network 130 by sending, to the controller 131 of the private data network 130, an address announcement including the MAC address of the customer bridging domain 122. The address announcement may include a mapping of the MAC address of the customer bridging domain 122 to a next-hop address for the MAC address of the customer bridging domain 122. The next-hop address for the MAC address of the customer bridging domain 122 provides an indication of a next hop from the private data network 130 toward the associated customer bridging domain 122 (e.g., an indication of the tunnel 129 from the associated switching element 132 to the customer bridging domain, such as one or more of a tunnel address, a tunnel identifier, tunnel endpoint identifiers, or the like, as well as various combinations thereof). The address announcement may be provided using a control plane advertisement mechanism for announcing address information in the control plane, such as Border Gateway Protocol (BGP)—Ethernet VPN (EVPN). The controller 121 and the controller 131 may have BGP-EVPN instances provisioned thereon and may establish a BGP-EVPN peering relationship and exchange information (including address announcements) using BGP-EVPN messages. It will be appreciated that, although primarily presented herein with respect to use of BGP-EVPN for announcing the MAC address within private data network, announcement of the MAC address by the controller 121 to the controller 131 may be provided any other protocol suitable for use in announcing the MAC address of the customer bridging domain 122. The address announcement may be provided from controller 121 of BNG 120 to the controller 131 of private data network 130 in other ways.

The controller 131 of the private data network 130 receives the address announcement, including the MAC address of the customer bridging domain 122, from the controller 121 of the BNG 120. The controller 131, upon receiving the address announcement including the MAC address of the customer bridging domain 122, configures the SFIB 133 of the switching element 132 associated with the customer bridging domain 122, to include the mapping of the MAC address of the customer bridging domain 122 to the next-hop address for the MAC address of the customer bridging domain 122. As discussed above, the next-hop address for the MAC address of the customer bridging domain 122 provides an indication of a next hop from the switching element 132 associated with the customer bridging domain 122 toward the customer bridging domain 122 (e.g., an indication of the tunnel 129 from the associated switching element 132 to the customer bridging domain, such as one or more of a tunnel address, a tunnel identifier, tunnel endpoint identifiers, or the like, as well as various combinations thereof). As discussed further below, the switching element 132 associated with the customer bridging domain 122 is configured to use the mapping of the MAC address of the customer bridging domain 122 to the next-hop address for the MAC address of the customer bridging domain 122 to control forwarding of received packets including the MAC address for the customer bridging domain 122 (e.g., packets including address resolution requests from the customer component 135 associated with the customer bridging domain 122 or packets intended for delivery to customer devices 112 of the associated customer premises 110 supported by the customer bridging domain 122).

The BNG 120 and the private data network 130 may be configured to support an address resolution mechanism for using address resolution, based on the MAC addresses of the customer premises 110, to enable customer components 135 of private data network 130 to communicate with customer devices 112 of customer premises 110 using the MAC addresses of the customer premises 110, respectively. The controller 121 of BNG 120, for a given customer premises 110, receives an address resolution request by the customer components 135 of the customer for customer devices 112 of the customer premises 110 and responds by providing an associated address resolution response to the customer component 135 of the customer.

The customer component 135 of a customer, based on a determination to communicate with one of the customer devices 112 of the customer, may access a local address resolution cache to determine whether the MAC address to be used to communicate with the customer device 112 (which, in this case, is the MAC address of the customer bridging domain 122 rather than the actual MAC address of the customer device 112) is already known. If the local address resolution cache available to the customer component 135 includes an entry for the IP address of the customer device 112 that maps the IP address of the customer device 112 to the MAC address to be used to communicate with the customer device 112, then the customer component 135 may begin sending packets to the customer device 112 without initiating an address resolution request. If the local address resolution cache available to the customer component 135 does not include an entry for the IP address of the customer device 112 that maps the IP address of the customer device 112 to the MAC address to be used to communicate with the customer device 112, then the customer component 135 must resolve the MAC address to be used to communicate with the customer device 112 before sending packets to the customer device 112 without initiating an address resolution request and, thus, initiates an address resolution process.

The customer component 135 sends an address resolution request on the LAN associated with the customer device 112. The address resolution request is a request for the MAC address to be used to communicate with the customer device 112, such that the customer component 135 may include the MAC address to be used to communicate with the customer device 112 within packets sent from the customer component 135 to the customer device 122. The address resolution request includes sender address information and target address information. The sender address information may include the MAC address and the IP address of the customer component 135 that is sending the address resolution request. The target address information includes the IP address of the customer device 112 for which the associated MAC address is being requested. Here, due to extension of the customer LAN 111 of the customer outside of the customer premises 110 and into the private data network 130 (namely, to the customer component 135 in the private data network 130), the customer component 135 sends the address resolution request toward the switching element 132 supporting the customer component 135. The switching element 132 receives the address resolution request from the customer component 135. The switching element 132 propagates the address resolution request toward the associated customer bridging domain 122 via the associated tunnel 129. The customer bridging domain 122 receives the address resolution request from the switching element 132 via the tunnel 129. The customer bridging domain 122 identifies the address resolution request and propagates the address resolution request toward the controller 121 for handling of the address resolution request. The customer bridging domain 122 may provide, with the address resolution request (e.g., via insertion within the address resolution request or via prepending or appending to the address resolution request), a customer bridging domain identifier of the customer bridging domain 122 (which, as discussed further below, may be used by the controller 121 to determine the MAC address of the customer bridging domain 122). The controller 121 receives the address resolution request from the customer bridging domain 122.

The controller 121 processes the address resolution request and generates an associated address resolution response. The controller 121 processes the address resolution request to determine the MAC address to be used to communicate with the customer device 112 (namely, the MAC address of the customer bridging domain 122, rather than the actual MAC address of the customer device 112 for which the address resolution request was received). The controller 121 may determine the MAC address of the customer bridging domain 122 based on a customer bridging domain identifier of the customer bridging domain 122 from which the controller 121 receives the address resolution request (e.g., the controller 121 uses the customer bridging domain identifier as a key to look up the MAC address of the customer bridging domain 122). The controller 121 may determine the MAC address of the customer bridging domain 122 based on the target address information of the address resolution request which includes the IP address of the customer device 112 (e.g., the controller 121 uses the IP address of the customer device 112 as a key to look up the MAC address of the customer bridging domain 122). The controller 121 generates the associated address resolution response including the MAC address of the customer bridging domain 122 (again, rather than the actual MAC address of the customer device 112 for which the address resolution request was received). The address resolution response includes source address information and target address information. The source address information includes the IP address of the customer device 112 (which was specified in the target address information of the address resolution request and used by the controller 121 for address resolution) and the MAC address of the customer bridging domain 122 (which was identified by the controller 121 during processing of the address resolution request and which is to be used to communicate with the customer device 112). The target address information of the address resolution response includes the IP address and MAC address of the customer component 135 which sent the address resolution request (e.g., copied from the source address information of the address resolution request into the target address information of the address resolution reply), such that the address resolution response may be routed back to the customer component 135 which sent the address resolution request. The controller 121 propagates the address resolution response toward the customer component 135 by propagating the address resolution response to the associated customer bridging domain 122 (i.e., the customer bridging domain 122 from which the address resolution request was received). The customer bridging domain receives the address resolution response from the controller 121. The customer bridging domain 122 propagates the address resolution response toward the associated switching element 132 via the associated tunnel 129. The switching element 132 receives the address resolution response from the customer bridging domain via the tunnel 129. The switching element propagates the address resolution response toward the customer component 135. The customer component 135 receives the address resolution response from the switching element 132.

The customer component 135 processes the address resolution response. The customer component 135 determines, from the source address information of the address resolution response, the MAC address to be used to communicate with the customer device 112 (again, the MAC address of the customer bridging domain 122, rather than the actual MAC address of the customer device 112). The customer component 135 may update a local address resolution cache to include a mapping of the IP address of the customer device 112 to the MAC address to be used to communicate with the customer device 112, thereby obviating the need for the customer component 135 to initiate an address resolution process the next time that the customer component 135 is going to communicate with the customer device 112.

The address resolution transaction between the customer component 135 and the controller 121 of BNG 120 may be performed using any suitable address resolution protocol (e.g., Address Resolution Protocol (ARP) or any other suitable protocol).

The BNG 120 and the private data network 130 may be configured to support an address translation mechanism for using address translation, based on the MAC addresses of the customer premises 110, to enable customer components 135 of private data network 130 to communicate with customer devices 112 of customer premises 110 using the MAC addresses of the customer premises 110, respectively. The customer component 135, when sending packets to a customer device 112, sends the packets using the MAC address of the customer bridging domain 122 (again, rather than the actual MAC address of the customer device 112) and the customer bridging domain 122 translates the MAC address of the customer bridging domain 122 into the MAC address of the customer device 112 for delivering the packets to the customer device 112.

The customer component 135 generates a packet intended for delivery to the customer device 112 within the customer premises 110. The packet includes source address information and destination address information. The source address information of the packet includes the IP address and the MAC address of the customer component 135. The destination address information of the packet includes the IP address of the customer device 112 and the MAC address to be used to communicate with the customer device 112 (namely, the MAC address of the customer bridging domain 122 rather than the actual MAC address of the customer device 112). The customer component 135 propagates the packet toward the switching element 132 supporting the customer component 135. The switching element 132 receives the packet from the customer component 135. The switching element 132 propagates the packet toward the customer bridging domain 122 via the tunnel 129. The customer bridging domain 122 receives the packet from the switching element 132 via the tunnel 129.

The customer bridging domain 122 performs an address translation function to replace, within the packet, the MAC address of the customer bridging domain 122 with the MAC address of the customer device 112 such that the packet may be delivered to the customer device 112. The customer bridging domain 122, upon receiving the packet including the MAC address of the customer bridging domain 122, performs an address lookup based on the IP address of the customer device 112 in order to determine the associated MAC address of the customer device 112. The customer bridging domain 122 modifies the packet to replace the MAC address of the customer bridging domain 122 with the MAC address of the customer device 112.

The customer bridging domain 122 propagates the modified packet toward the customer bridge 113 of the customer premises 110 in which the customer device 112 is located. The customer bridging domain 122 propagates the modified packet toward the customer bridge 113 of the customer premises 110 via the associated tunnel 119. The customer bridge 113 of the customer premises 110 receives the modified packet from the customer bridging domain via the tunnel 119. The customer bridge 113 routes the modified packet to the customer device 112 for which the modified packet is intended. The customer bridge 113 routes the modified packet to the customer device 112 for which the modified packet is intended based on the MAC address of the customer device 112 for which the packet is intended.

It is noted that, in the upstream direction, for packets transmitted by a customer device 112 toward a customer component 135 of the private data network 130, address translation based on the MAC address of the customer bridging domain 122 may or may not be used. In the case in which address translation based on the MAC address of the customer bridging domain 122 is used, the customer bridging domain 122, upon receiving a packet from the customer device 112, modifies the source MAC address of the packet from including the MAC address of the customer device 112 to including the MAC address of the customer bridging domain 122.

Figure 2:
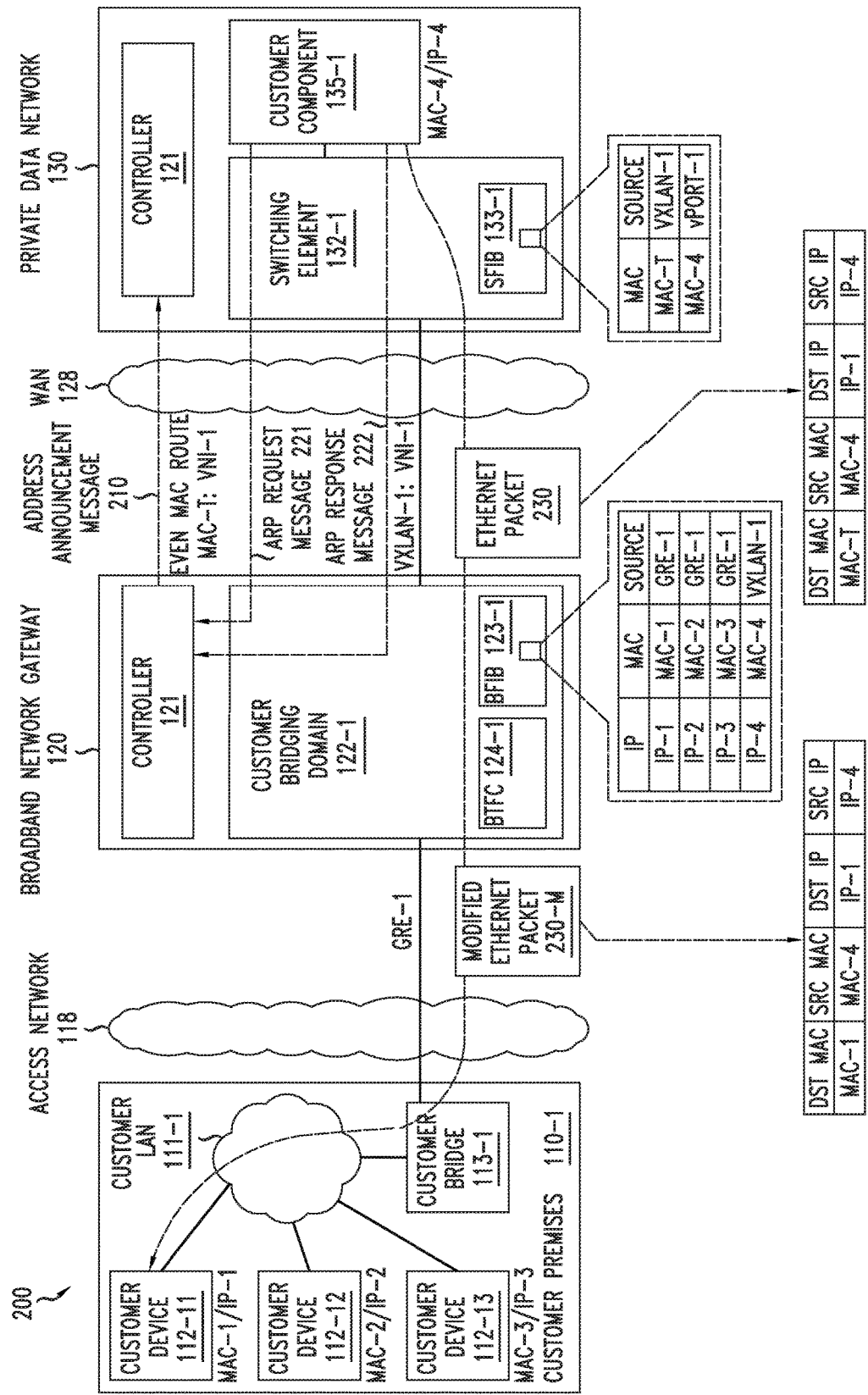
FIG. 2 depicts an example illustrating use of an addressing mechanism to support extension of local area networks of customer premises to a private data network.

These and various other embodiments of the addressing mechanism adapted for extending the local area network of the customer premises of a customer outside of the customer premises and into a private data network with improved scalability and performance may be further understood by way of reference to the example of FIG. 2.

FIG. 2 depicts an example illustrating use of an addressing mechanism to support extension of local area networks of customer premises to a private data network.

The system 200 of FIG. 2 illustrates portions of the system 100 of FIG. 1. Namely, the system 200 of FIG. 2 illustrates customer premises 110-1, BNG, controller 121 and customer bridging domain 122-1 of BNG 120, and controller 131, switching element 132-1, and customer component 135-1 of private data network 130. The remaining portions of system 100 of FIG. 1 are omitted from FIG. 2 for purposes of clarity.

The system 200 of FIG. 2 illustrates a specific example in which the customer premises 110-1 includes three customer devices (illustratively, customer device 112-11, customer device 112-12, and customer device 112-13) and a single customer component 135-1 for the customer is hosted within the private data network 130. The customer devices 112-1 and customer component 135-1 each have a MAC address and an IP address assigned thereto as follows: MAC-1/IP-1 for customer device 112-11, MAC-2/IP-2 for customer device 112-12, MAC-3/IP-3 for customer device 112-13, and MAC-4/IP-4 for customer component 135-1. Additionally, the customer bridging domain 122-1 has a MAC address assigned thereto (denoted as MAC-T) which as discussed herein, may be a real MAC address or a fake MAC address. Additionally, the virtual network identifier (VNI) associated with the customer LAN of the customer is denoted as VNI-1, the tunnel identifier of the tunnel 119 is denoted as GRE-1, and the tunnel identifier of the tunnel 129-1 of the customer is denoted as VXLAN-1. The SFIB 133-1 of switching element 132-1 includes the following two entries mapping MAC addresses to Sources: (1) a first entry mapping the MAC address of the customer bridging domain 122-1 to the tunnel 129 (illustratively, MAC-T mapped to VXLAN-1) and (2) a second entry mapping the MAC address of customer component 135-1 to the virtual port associated with the customer component 135-1 (illustratively, MAC-4 to vPort-1). The BFIB 123-1 of customer bridging domain 122-1 includes the following four entries mapping IP addresses, MAC addresses, and Sources: (1) a first entry associated with customer device 112-11 that includes the IP address (IP-1), MAC address (MAC-1), and source (GRE-1) mapping for customer device 112-11; (2) a second entry associated with customer device 112-12 that includes the IP address (IP-2), MAC address (MAC-2), and source (GRE-1) mapping for customer device 112-12; (3) a third entry associated with customer device 112-13 that includes the IP address (IP-3), MAC address (MAC-3), and source (GRE-1) mapping for customer device 112-13; and (4) a fourth entry associated with customer component 135-1 that includes the IP address (IP-4), MAC address (MAC-4), and source (VXLAN-1) mapping for customer component 135-1.

The system 200 of FIG. 2 illustrates use of an addressing mechanism to support extension of the LAN 111-1 of customer premises 110-1 into the private data network 130. In this example, further assume that customer component 135-1 would like to communicate with the customer device 112-11 of customer premises 110-1.

The controller 121 of BNG 120 announces the MAC address of the customer bridging domain 122-1 to the controller 131 of the private data network 130 using BGP-EVPN (illustrated as an address announcement message 210 including an EVPN MAC Route: MAC-T:VNI-1).

The customer component 135-1 generates an ARP request message 221 including the IP address of customer device 112-11 (namely, IP-1). The customer component 135-1 sends the ARP request message 221 via the LAN of the customer. The ARP request message 221 is received by the controller 121 via the switching element 132-1, the tunnel 129-1, and the customer bridging domain 122-1. The controller 121 determines the MAC address of the customer bridging domain 122-1 (namely, MAC-T) based on the IP address of the customer device 112-11 in the ARP request message 221 and generates an ARP response message 222 including the IP address of the customer device 112-11 (namely, IP-1) and the MAC address of the customer bridging domain 122-1 (namely, MAC-T). The controller 121 sends the ARP response message 222 to the customer component 135 via the customer bridging domain 122-1, the tunnel 129, and the switching element 132-1. The customer component 135-1, upon receiving ARP response message 222, has a mapping of the IP address of the customer device 112-11 (IP-1) to the MAC address that is to be used by the customer component 135-1 (MAC-T) to communicate with the customer device 112-11. The customer component 135-1, upon receiving ARP response message 222, may store the mapping of the IP address of the customer device 112-11 (IP-1) to the MAC address that is to be used by the customer component 135-1 (MAC-T) to communicate with the customer device 112-11 (e.g., in SFOB 133-1, in a local ARP cache, or the like, as well as various combinations thereof).

The customer component 135-1 generates an Ethernet packet 230 intended for delivery to customer device 112-11. The Ethernet packet 230 includes a source IP address field (IP-4), a destination IP address field (IP-1), a source MAC address field (MAC-4), and a destination MAC address field (MAC-T). The customer component 135-1 transmits the Ethernet packet 230 to the switching element 132-1 supporting customer component 135-1. The switching element 132-1 performs a lookup into SFIB 133-1, based on the destination MAC address (MAC-T), and determines that the Ethernet packet 230 is to be transmitted via tunnel 129-1 (VXLAN-1). The switching element 132-1 sends the Ethernet packet 230 via tunnel 129-1. The customer bridging domain 122-1 receives Ethernet packet 230 via tunnel 129-1. The customer bridging domain 122-1 performs an address translation function for Ethernet packet 230 to form a modified Ethernet packet 230-M. The customer bridging domain 122-1 1 performs a lookup into BFIB 123-1, based on the destination IP address (IP-1), to determine the MAC address of the customer device 112-11 (MAC-1). The customer bridging domain 122-1 modifies the destination MAC address field of Ethernet packet 230, by replacing the MAC address of the customer bridging domain 122-1 (MAC-T) with the MAC address of the customer device 112-11 (MAC-1), to provide thereby the modified Ethernet packet 230-M. The customer bridging domain 122-1 propagates the modified Ethernet packet 230-M toward the customer premises 110-1, via tunnel 119-1, for delivery to the customer device 112-11.

It will be appreciated that, although primarily presented herein with respect to embodiments of the addressing mechanism in which specific types of Layer 2 (L2) addresses (namely, MAC addresses) and specific types of Layer 3 (L3) addresses (namely, IP addresses) are used, various embodiments of the addressing mechanism adapted for extending the local area networks of the customer premises outside of the customer premises and into the private data network may be adapted to use other types of L2 addresses or other types of L3 addresses. Accordingly, the exemplary methods of FIG. 3 and FIG. 4 are described more generally within the context of using L2 addresses and L3 addresses to provide various embodiments of the addressing mechanism.

Figure 3:
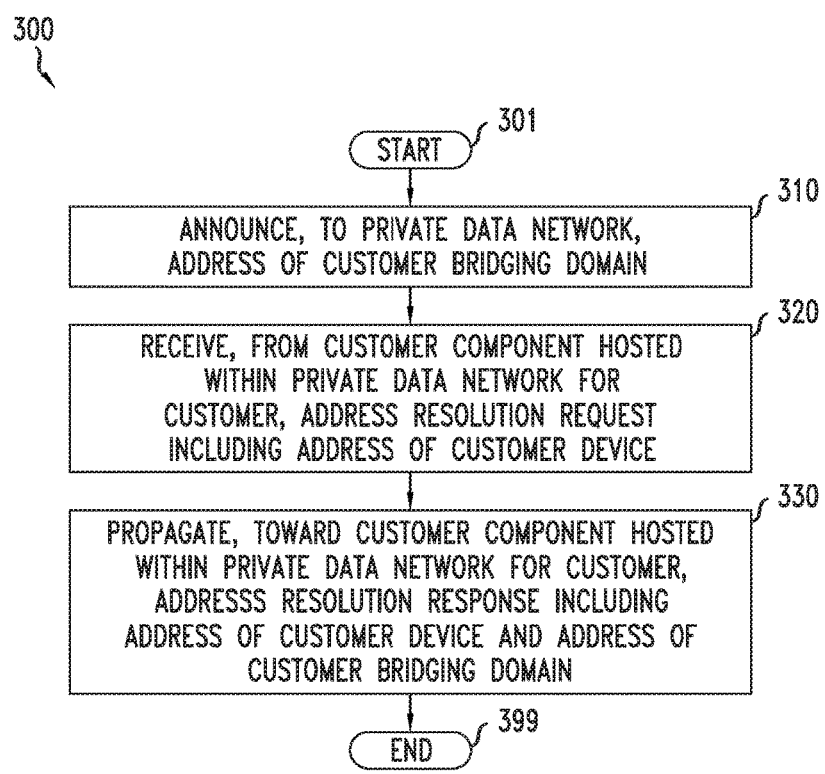
FIG. 3 depicts a flow diagram of a method for using an addressing mechanism to support extension of local area networks of customer premises to a private data network.
Figure 4:
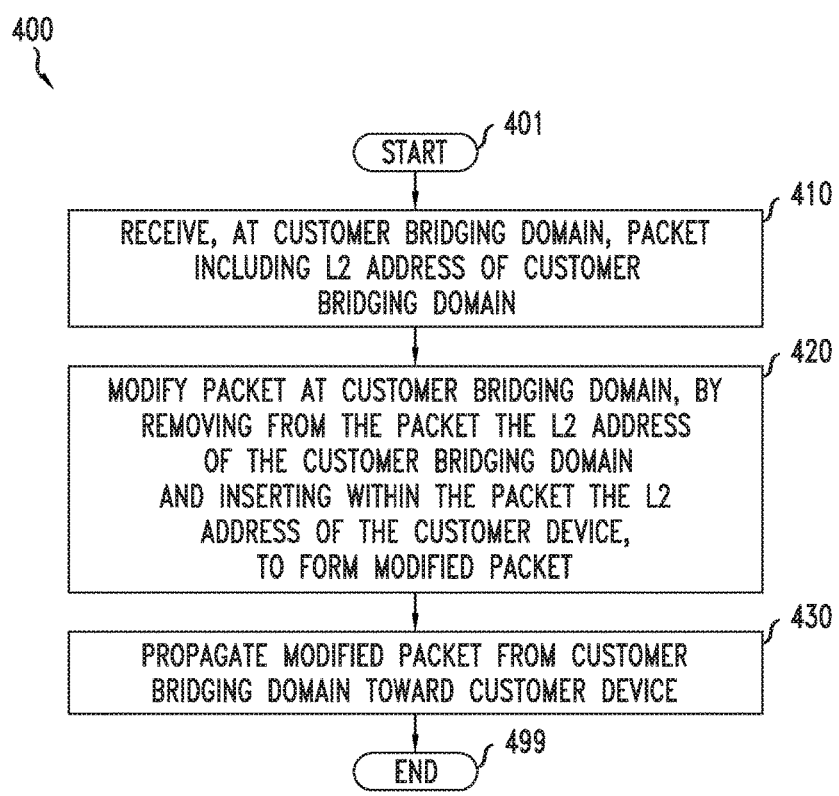
FIG. 4 depicts a flow diagram of a method for using an addressing mechanism to support extension of local area networks of customer premises to a private data network.

FIG. 3 depicts a flow diagram of a method for using an addressing mechanism to support extension of local area networks of customer premises to a private data network. It is noted that the method 300 of FIG. 3 may be executed by a control plane of a network device on the path between the private data network and the customer premises, such as by a controller of a broadband network gateway (e.g., the controller 121 of the BNG 120 of FIG. 1). It will be appreciated that, although primarily presented herein as being performed serially, at least a portion of the functions of method 300 may be performed contemporaneously or in a different order than as presented in FIG. 3.

At block 301, method 300 begins.

At block 310, the L2 address of the customer bridging domain is announced to the private data network.

At block 320, an address resolution request is received. The address resolution request is received from a customer component hosted within the private data network for the customer. The address resolution request is for a customer device that is located within the customer premises of the customer. The address resolution request includes an L3 address of the customer device.

At block 330, an address resolution response is propagated. The address resolution response is propagated toward the customer component hosted within the private data network for the customer. The address resolution response is for the customer device. The address resolution response includes an L2 address of the customer bridging domain hosted within the network device for the customer.

At block 399, method 300 ends. It is noted that the various functions of method 300 of FIG. 3 may be further understood when considered in conjunction with FIG. 1 and FIG. 2.

FIG. 4 depicts a flow diagram of a method for using an addressing mechanism to support extension of local area networks of customer premises to a private data network. It is noted that the method 400 of FIG. 4 may be executed by a data plane of a network device on the path between the private data network and the customer premises, such as by a customer bridging domain of a broadband network gateway (e.g., a customer bridging domain 122 of the BNG 120 of FIG. 1). It will be appreciated that, although primarily presented herein as being performed serially, at least a portion of the functions of method 400 may be performed contemporaneously or in a different order than as presented in FIG. 4.

At block 401, method 400 begins.

At block 410, a packet is received at the customer bridging domain. The packet is a packet of a customer component hosted within the private data network for the customer. The packet is received via a first tunnel between a switching element provided within the private data network to support the customer component of the customer and the customer bridging domain. The packet is intended for a customer device of the customer that is located within the customer premises and associated with a customer network element of the customer. The packet includes an L3 source address field including the L3 address of the customer component, an L2 source address field including the L2 address of the customer component, an L3 destination address field including an L3 address of the customer device, and an L2 destination address field including the L2 address of the customer bridging domain.

At block 420, the packet is modified at the customer bridging domain, by removing from the L2 destination address field the L2 address of the customer bridging domain and inserting within the L2 destination address field an L2 address of the customer device, to form a modified packet. The packet may be modified, to form the modified packet, responsive to a determination that L2 destination address field includes the L2 address of the customer bridging domain, rather than the L2 address of the customer device for which the packet is intended.

At block 430, the modified packet is propagated from the customer bridging domain toward the customer device. The modified packet is propagated from the customer bridging domain toward the customer device by propagating the packet toward the customer network element supporting communications by the customer device. The modified packet is propagated via a second tunnel between the customer bridging domain and the customer network element.

At block 499, method 400 ends.

It is noted that the various functions of method 400 of FIG. 4 may be further understood when considered in conjunction with FIG. 1 and FIG. 2.

It will be appreciated that, although method 300 of FIG. 3 and method 400 of FIG. 4 are primarily presented herein standalone processes, in at least some embodiments the functions of method 300 and the functions of method 400 may be combined into a single process.

It will be appreciated that, although primarily presented herein with respect to embodiments of the addressing mechanism that are provided within a particular context in which EVPN may be employed (namely, within the context of extending a customer local area network of a customer premises of a customer outside of the customer premises and into a private data network), embodiments of the addressing mechanism may be provided within various other contexts within which EVPN may be employed to provide an L2/L3 VPN (including contexts in which the "customer" is not an end customer of a customer premises). For example, embodiments of the addressing mechanism may be provided within contexts in which the "customer" is actually a service provider (e.g., in which case the customer network element may be a customer edge (CE) device of a service provider), such as where the addressing mechanism may be used within a core network for customer devices associated with a corresponding service provider and the customer network device is a CE device disposed within a network of the service provider. For example, embodiments of the addressing mechanism may be provided within contexts in which the "customer" is actually a network provider or a network of a network provider (e.g., in which case the customer network element may be a provider edge (PE) device of a network provider), such as where the addressing mechanism may be used within a core network for customer devices associated with a corresponding access network and the customer network device is a PE device disposed within the access network, where the addressing mechanism may be used within a first backbone network for customer devices associated with a second backbone network and the customer network device is a PE device disposed within the second backbone network, or the like. Accordingly, it will be appreciated that, in at least some embodiments, terms used herein that are specific to embodiment in which the addressing mechanism is used within the context of extending a customer local area network of a customer premises of a customer outside of the customer premises and into a private data network may be read more generally (e.g., "customer premises" may be read more generally as "customer location", "customer network element" may be read more generally as "network element" or "edge device", or the like, as well as various combinations thereof. It will be appreciated that embodiments of the addressing mechanism may be provided within various other contexts.

It will be appreciated that, although primarily presented herein with respect to embodiments of the addressing mechanism that are provided within EVPN-based contexts, embodiments of the addressing mechanism may be provided within various other types of contexts including non-EVPN-based contexts.

It will be appreciated that, although primarily presented herein with respect to embodiments of the addressing mechanism operating at specific communications layers, various embodiments of the addressing mechanism may be configured to operate at various other communication layers.

Figure 5:
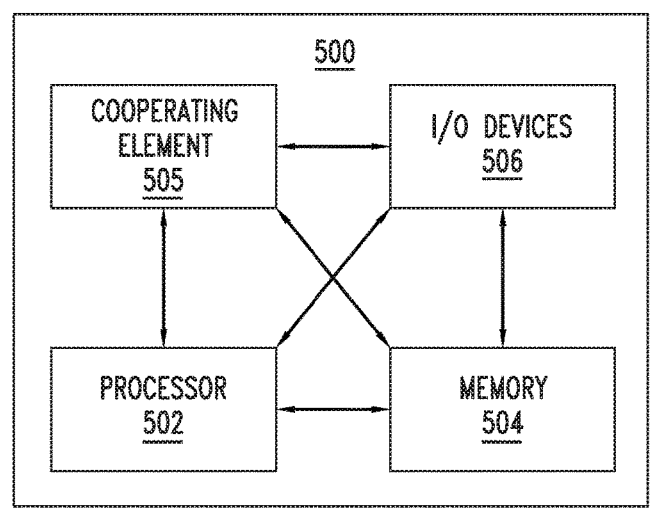
FIG. 5 depicts a high-level block diagram of a computer suitable for use in performing various functions described herein.

FIG. 5 depicts a high-level block diagram of a computer suitable for use in performing various functions described herein.

The computer 500 includes a processor 502 (e.g., a central processing unit (CPU), a processor having a set of processor cores, a processor core of a processor, or the like) and a memory 504 (e.g., a random access memory (RAM), a read only memory (ROM), or the like). The processor 502 and the memory 504 are communicatively connected.

The computer 500 also may include a cooperating element 505. The cooperating element 505 may be a hardware device. The cooperating element 505 may be a process that can be loaded into the memory 504 and executed by the processor 502 to implement functions as discussed herein (in which case, for example, the cooperating element 505 (including associated data structures) can be stored on a computer-readable storage medium, such as a storage device or other storage element (e.g., a magnetic drive, an optical drive, or the like)).

The computer 500 also may include one or more input/output devices 506. The input/output devices 506 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 500 of FIG. 5 may represent a general architecture and functionality suitable for implementing functional elements described herein, portions of functional elements described herein, or the like, as well as various combinations thereof. For example, computer 500 may provide a general architecture and functionality that is suitable for implementing one or more of a customer device 112 of a customer premises 110, a customer bridge 113 of a customer premises 110, BNG 120, controller 121, a customer bridging domain 122, customer management element 125, an element or set of elements of private data network 130, a switching element 132, a customer component 135, an element or set of elements of public data network 140, or the like.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It will be appreciated that at least some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory including computer program code;
   wherein the at least one memory and the computer program code are configured to, with the at least one processor, cause the apparatus to at least:
      announce, by a controller of a network device toward a controller of a private data network, an address of a customer bridging domain, wherein the customer bridging domain is hosted on the network device and is associated with a customer network element of a customer premises, wherein the customer bridging domain is configured to support communications between a customer device of the customer premises and a customer component hosted within the private data network;
      receive, by the controller of the network device from the customer bridging domain, an address resolution request initiated by the customer component for the customer device, the address resolution request comprising an address of the customer device; and
      send, by the controller of the network device toward the customer bridging domain, an address resolution response intended for the customer component, the address resolution response comprising the address of the customer device and the address of the customer bridging domain.

2. The apparatus of claim 1, wherein the address of the customer bridging domain comprises a Layer 2 (L2) address.

3. The apparatus of claim 2, wherein the L2 address comprises a Media Access Control (MAC) address.

4. The apparatus of claim 1, wherein the address of the customer device comprises a Layer 3 L3) address.

5. The apparatus of claim 4, wherein the L3 address comprises an Internet Protocol (IP) address.

6. The apparatus of claim 1, wherein the customer bridging domain comprises a Layer 2 (L2) virtual bridge.

7. The apparatus of claim 1, wherein the at least one memory and the computer program code are configured to, with the at least one processor, cause the apparatus to at least:
   obtain the address of the customer bridging domain prior to announcing the address of the customer bridging domain.

8. The apparatus of claim 7, wherein, to obtain the address of the customer bridging domain, the at least one memory and the computer program code are configured to, with the at least one processor, cause the apparatus to at least:

derive the address of the customer bridging domain; or retrieve the address of customer bridging domain from the customer bridging domain or from a server.

9. The apparatus of claim 1, wherein the at least one memory and the computer program code are configured to, with the at least one processor, cause the apparatus to at least:

determine the address of the customer bridging domain, for inclusion in the address resolution response, based on the address of the customer device.

10. The apparatus of claim 1, wherein the address resolution request comprises an identifier of the customer bridging domain, wherein the at least one memory and the computer program code are configured to, with the at least one processor, cause the apparatus to at least:

determine the address of the customer bridging domain, for inclusion in the address resolution response, based on the identifier of the customer bridging domain.

11. A method, comprising:

announcing, by a controller of a network device toward a controller of a private data network, an address of a customer bridging domain, wherein the customer bridging domain is hosted on the network device and is associated with a customer network element of a customer premises, wherein the customer bridging domain is configured to support communications between a customer device of the customer premises and a customer component hosted within the private data network;

receiving, by the controller of the network device from the customer bridging domain, an address resolution request initiated by the customer component for the customer device, the address resolution request comprising an address of the customer device; and sending, by the controller of the network device toward the customer bridging domain, an address resolution response intended for the customer component, the address resolution response comprising the address of the customer device and the address of the customer bridging domain.

12. The method of claim 11, wherein the address of the customer bridging domain comprises a Layer 2 (L2) address.

13. The method of claim 12, wherein the L2 address comprises a Media Access Control (MAC) address.

14. The method of claim 11, wherein the address of the customer device comprises a Layer 3 (L3) address.

15. The method of claim 14, wherein the L3 address comprises an Internet Protocol (IP) address.

16. The method of claim 11, wherein the customer bridging domain comprises a Layer 2 (L2) virtual bridge.

17. The method of claim 11, further comprising:

obtaining the address of the customer bridging domain prior to announcing the address of the customer bridging domain.

18. The method of claim 17, wherein obtaining address of the customer bridging domain comprises:

deriving the address of the customer bridging domain; or retrieving the address of customer bridging domain from the customer bridging domain or from a server.

19. The method of claim 11, further comprising:

determining the address of the customer bridging domain, for inclusion in the address resolution response, based on the address of the customer device.

20. The method of claim 11, wherein the address resolution request comprises an identifier of the customer bridging domain, the method further comprising:

determining the address of the customer bridging domain, for inclusion in the address resolution response, based on the identifier of the customer bridging domain.

* * * * *